(12) United States Patent
Ngo

(10) Patent No.: US 6,775,304 B1
(45) Date of Patent: Aug. 10, 2004

(54) MULTI-CHANNEL IMPLEMENTATION APPROACH FOR SUPERCONDUCTING DIGITAL ROUTER/SIGNAL PROCESSOR

(75) Inventor: Kiet D. Ngo, San Mateo, CA (US)

(73) Assignee: Northrop Grumman Corporation, Los Angeles, CA (US)

(*) Notice: Subject to any disclaimer, the term of this patent is extended or adjusted under 35 U.S.C. 154(b) by 766 days.

(21) Appl. No.: 09/711,500

(22) Filed: Nov. 13, 2000

(51) Int. Cl.[7] .............................................. H04J 3/04
(52) U.S. Cl. ...................................... 370/532; 341/157
(58) Field of Search ................................ 341/126–172; 370/532, 533, 351

(56) References Cited

U.S. PATENT DOCUMENTS

| | | | |
|---|---|---|---|
| 4,635,037 A | * 1/1987 | Iwamura | 341/136 |
| 5,942,997 A | 8/1999 | Silver et al. | |
| 6,163,566 A | * 12/2000 | Shiino | 375/143 |
| 6,173,008 B1 | * 1/2001 | Lee | 375/148 |
| 6,225,936 B1 | * 5/2001 | Silver et al. | 341/157 |
| 6,377,613 B1 | * 4/2002 | Kawabe et al. | 375/142 |

* cited by examiner

*Primary Examiner*—Ricky Ngo
*Assistant Examiner*—Jason Mattis
(74) *Attorney, Agent, or Firm*—Harness, Dickey & Pierce, P.L.C.

(57) ABSTRACT

A multi-channel superconducting digital router/signal processor (28) for processing and conditioning an analog input signal (12) and converting it to a digital output signal (26). The digital router/signal processor (28) includes a plurality of bandpass filters (11), a plurality of voltage control pulse generators (14), a plurality of pulse splitters (30), a plurality of pulse gates (20), a plurality of pulse combiners (32), a plurality of multiply-accumulator circuits (24), and a digital processing unit (36). The multiply-accumulator circuit (24) can be programmed to any octave of the analog input signal (12). This multi-channel implementation approach provides many conversion functions in a single assembly and is easily scaleable and configurable to meet a wide range of system requirements without having to go through new design/manufacturing cycles.

16 Claims, 3 Drawing Sheets

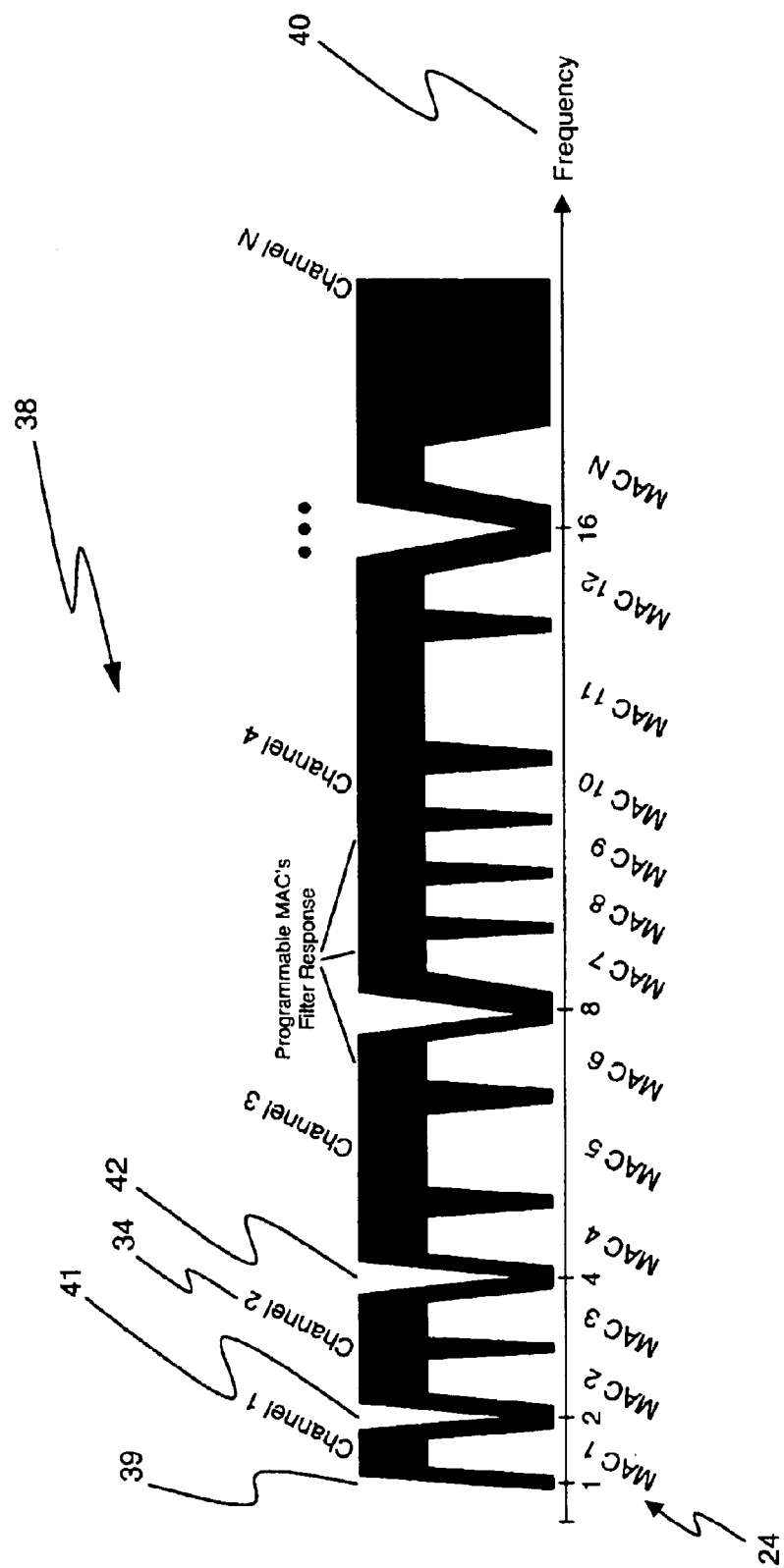

MULTI-CHANNEL IMPLEMENTATION APPROACH FOR SUPERCONDUCTING DIGITAL ROUTER/SIGNAL PROCESSOR

CROSS REFERENCE TO RELATED APPLICATIONS AND PATENTS

This application is related to the following U.S. patent and pending patent applications, which are assigned to the same assignee as the present invention and which are herein incorporated by reference:

1. U.S. Pat. No. 5,942,997, issued Aug. 24, 1999, titled "Correlated Superconductor Single Flux Analog-to-Digital Converter";

2. U.S. Pat. No. 6,127,860, issued Oct. 10, 2000, titled "Direct Digital Downconverter based on Oscillator/Counter Analog-to-Digital Converter";

3. U.S. Pat. No. 6,225,936, issued May 1, 2001, titled "Direct Digital Downconverter and Method for Converting an Analog Signal to a Digital Signal"; and 4. U.S. Pat. No. 6,388,600, issued May 16, 2002, titled "Asynchronous Superconductor Serial Multiply-Accumulator".

The U.S. Government has certain rights in this invention pursuant to the clause at FAR 52.227-12.

BACKGROUND OF THE INVENTION

1. Field of the Invention

The present invention is directed to a digital router/signal processor, and more particularly, to a multi-channel superconducting digital signal processing method for analog-to-digital signal conversion.

2. Discussion of the Related Art

Different modulation techniques are known in the art, such as amplitude modulation, frequency modulation, phase modulation, etc., that impress information onto a carrier signal to be transmitted. The carrier signal is received by a receiver that removes the carrier signal to separate and decipher the transmitted information. To remove the carrier signal, state of the art receivers typically include an analog mixer or a frequency downconverter that multiplies the received carrier signal with a local oscillator signal to convert the signal to a lower intermediate or baseband frequency. The downconverted frequency signal is then filtered by a bandpass filter that passes the frequencies of interest that include the extracted information. The filtered signal is then converted to a digital signal by an analog-to-digital (A/D) converter to provide a digital representation of the information that is subsequently processed by a microprocessor. This general description of the process for extracting information from a carrier signal is well known to those skilled in the art.

Existing superconducting technology can simultaneously perform frequency translation (up or down conversion), bandpass filtering, and analog-to-digital conversion on the analog signal at its input. Oscillator/counter A/D converters that use superconducting, Josephson single flux quantum (SFQ) circuits for converting an analog signal to a digital signal are known in the art. See, for example, L. R. Eaton, et al., "Design of a 10 K NbN A/D Converter for IR Focal Plane Array Sensors," IEEE Transactions on Applied Superconductivity, 5, 2457, (1995) and U.S. Pat. No. 5,942,997. An improvement to the oscillator/counter A/D converter architecture of the type disclosed in the L. R. Eaton et al. Article and U.S. Pat. No. 5,942,997 can be found in U.S. Pat. No. 6,127,960, which is hereby incorporated by reference.

A general depiction of a digital signal processor 10 of the type disclosed in U.S. Pat. No. 6,127,960 is shown in FIG. 1. An analog input signal 12 to be converted is applied to a bandpass filter 11. The filtered signal from the bandpass filter 11 is applied to a voltage control pulse generator (VCPG) 14 that generates pulses based on the applied voltage of the filtered signal. The frequency of an output pulse train 18 from the VCPG 14 is directly proportional to the input voltage level. The pulse train 18 is gated by a pulse gate (PG) 20, where the pulse gate width is determined by a gate Flo signal 22. The pulse train 18 is effectively mixed with the Flo signal 22 which is used to control the frequency translation process.

The pulses that pass through the pulse gate 20 get multiplied and accumulated in a multiply-accumulator circuit (MAC) 24. A general depiction of the MAC 24 is disclosed in U.S. Pat. No. 6,288,600, referenced above. The MAC 24 multiplies the series of pulses by a binary coefficient and accumulates the product for a predetermined period of time. The MAC 24 improves the frequency response and eliminates the periodic responses that are out of band, thus eliminating the direct current (DC) response. A digital control signal 25 is applied to the MAC 24 to program the bandpass filter response. The digital control signal 25 includes a reset signal that defines a predetermined sampling period and provides an initiation of a new accumulation of outputs from the pulse gates 20. The sampling period covers a plurality of consecutive control pulses of the Flo signal 22. The process converts the gated pulses into digital words 26. The output of the MAC 24 is the digital version of the analog signal at the VCPG's input. This operation produces an analog-to-digital conversion of a non-integrating analog-to-digital converter.

A multi-channel approach could offer more operational flexibility in terms of functionality and scaleability. With a multi-channel approach the end user will have a greater flexibility in configuring and reconfiguring a radio frequency (RF) spectrum of interest to perform specific operational needs or to adapt to a changing input signal environment without having to implement new design/manufacturing cycles.

It is an object of the present invention to provide a multi-channel approach to digital signal processing in a single assembly that allows for greater end-user operational flexibility and is easily scaleable and configurable as compared to a single-channel approach. Such a multi-channel approach provides a significant cost saving.

SUMMARY OF THE INVENTION

In accordance with the teachings of the present invention, a multi-channel digital router/signal processor is disclosed that provides frequency translation, bandpass filtering, routing, wideband channelization, digital multiplexing, analog-to-digital interleaved sampling, and channel path redundancy functions. The present invention accomplishes the multi-channel approach by expanding on a single channel approach through the use of pulse splitters (PS), pulse gates (PG), and pulse combiners (PC), and multiplying and accumulating the RF spectrum input signal to obtain a channel routed/processed digital output signal. Accordingly, the present invention will enable the end user to have a greater operational flexibility in configuring specific operational needs without the sacrifices afforded to size, weight and DC power. Additional channels could be added by increasing the size of the pulse splitters and pulse combiners to provide scaleability. This approach would also have a significant cost saving regarding design/manufacturing cycles to meet system requirements.

Additional objects, advantages, and features of the present invention will become apparent from the following description and appended claims, taken in conjunction with the accompanying drawings.

BRIEF DESCRIPTION OF THE DRAWINGS

The various advantages of the present invention will become apparent to those skilled in the art after reading the following specification and by reference to the drawings, in which:

FIG. 3 is a diagram of a routing and wideband channelization illustration using the present invention illustrated in FIG. 2.

DETAILED DESCRIPTION OF THE PREFERRED EMBODIMENT

The following description of the present invention is merely exemplary in nature and is in no way intended to limit the invention or its uses. Moreover, the following description, while depicting a digital signal processor employing a multichannel implementation of a superconducting digital router/signal processing method, is for the sake of example only and the scope and spirit of the invention are to be construed by appropriate interpretation of the appended claims.

Figure 1:
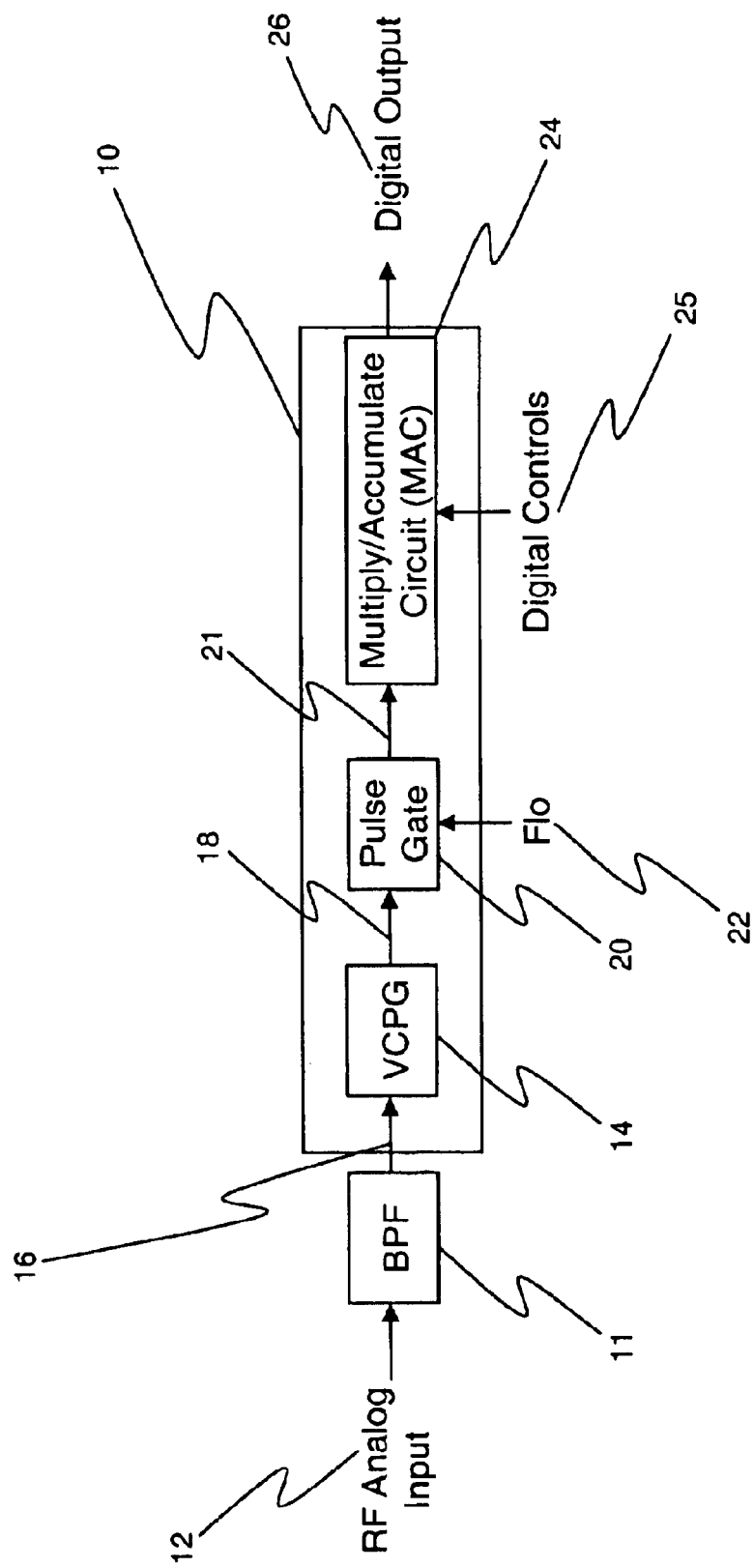
FIG. 1 is a diagram of a single channel superconducting digital signal processor.
Figure 2:
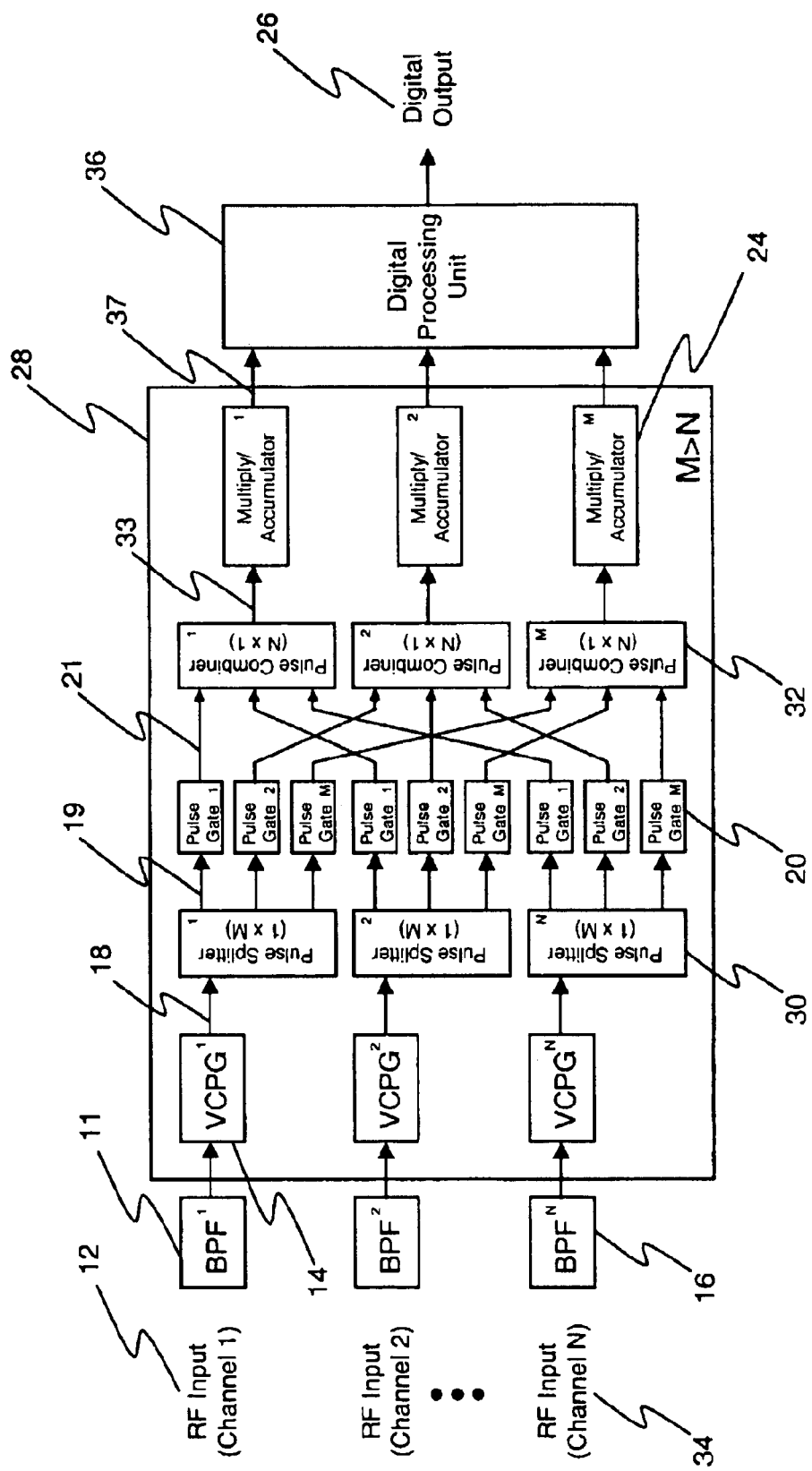
FIG. 2 is a diagram of a multi-channel implementation of a superconducting digital router/signal processor according to an embodiment of the present invention.

FIG. 2 is a schematic block diagram of a multi-channel digital router/signal processor 28 that simultaneously converts a plurality of analog input signals 12 in N separate RF input channels 34, according to the invention. Each separate channel 34 employs a bandpass filter 11, a VCPG 14, a plurality of pulse gates 20, and a MAC 24 which operate in the same manner as those described above for the digital signal processor 10. In this embodiment, the original analog input signal 12 is frequency segregated by the bandpass filters 11 so that each channel 34 converts one octave of the signal 12. By separating the input signal in this manner, improvements in scaleability can be realized.

According to the invention, the digital router/signal processor 28 employs a pulse splitter 30 and a pulse combiner 32 for each RF input channel 34. The pulse train 18 from the VCPG 14 in each RF input channel 34 is split M number of times by the pulse splitters 30. Hence, there are N number of pulse splitters 30 for the N number of pulse trains 18 output from the N number of VCPGs 14. Each split pulse 19 from the pulse splitter 30 is applied to a separate pulse gate 20, hence each channel includes M number of pulse gates 20. Each pulse gate 20 receives a Flo signal 22, and operates in the same manner as the pulse gate 20 discussed above for the digital signal processor 10. Each pulse gate 20 has an "on" mode, where the split, pulse train 18 is gated by the Flo signal 22, and an "off" mode, where the pulse gate 20 prevents the gated pulses from being applied to the pulse combiners 32.

Each pulse combiner 32 receives the gated pulses from any multiple of the pulse gates. 20 irrespective of the RF input channel 12, and combines them into a single pulse train 33. Hence, there are M number of pulse combiners 32 to receive the M number of gated pulses 21 from the pulse gates 20. Each pulse combiner 32 may be receiving a series of pulses from any particular pulse gate 20, depending on whether the pulse gate 20 is in its on mode or its off mode. The present invention requires that M be greater than N. This allows multiple MACs 24 to sample the same channel 34 of the RF analog input 12. By receiving the gated pulse train from any separate portion of the original signal wideband channelization, routing, and interleaved signal sampling is possible.

The combined output 33 of the gated pulses 21 from the combiners 32 is applied to a separate MAC 24. There are M number of MACs 24 to receive the combined output 33 from the M number of pulse combiners 32. The outputs 37 from the MACs 24 are then applied to a digital processing unit 36 that combines the outputs 37 to provide the processed digital output signal 26 from the RF input channels 34.

When the pulses are passed by the pulse gates 20, the multiply-accumulator circuit 24, which includes a counter circuit (not shown), accumulates the pulses during a sampling period. The sampling period covers a range of gate control pulses, so that the accumulation of pulses includes consecutive on/off periods of the Flo signal 22. Passing and blocking pulses is equivalent to multiplication of the pulse train 18 by one and zero, respectively, which is also included in the multiply-accumulator circuit 24 design. The MAC 24 acts as a finite impulse response digital filter which multiplies each of the samples with a different weight.

In addition to frequency translation, bandpass filtering and analog-to-digital conversion, a routing function can now be accomplished by appropriately controlling the pulse gates 20. The output from any MAC 24 can be sent to any input channel. Wideband channelization is another popular application of this concept. Having N channels 34 and M MACs 24 (M>N) allows multiple MACs 24 to process different portions of an RF channel's frequency spectrum 40.

FIG. 3 illustrates an example of routing and wideband channelization that can be performed by the processor 28, according to the present invention. Digital multiplexing is possible with this approach. For example, the "on" time 39 and the "off" time 41 of the pulse gates 20 and the counter reset in the MACs 24 can be controlled such that each MAC 24 can thoroughly sample the signals from 1 to N channels 34.

Analog-to-digital interleaved sampling to improve the digital router/signal processor's effective sampling rate is another option of this concept. To achieve this function, for channel 1, the "on" time 39 of the pulse gate 20 connected at the output of the pulse splitter 30 is staggered such that the MACs 24 that follow sample different parts of the analog signal input 12 frequency spectrum 40, which have assigned one octave per channel. The outputs 37 from the MACs 24 are then multiplexed together providing a higher effective sampling rate compared to any individual MAC.

Redundancy paths 42 which improve overall system reliability are also inherent in this concept. The end users will have a tremendous flexibility in configuring and reconfiguring the multi-channel superconducting analog-to-digital signal conversion to perform specific operational needs or to adapt to changing input signal environments.

In terms of scaleability, additional channels can be added by increasing the size of the pulse splitters 30 and pulse combiners 32. A two-dimensional (N×N) version of this approach can also be implemented to support imaging applications such as synthetic aperture radar (SAR). This embodiment, replaces many components that are needed to perform the multi-channel analog-to-digital signal processing functions in existing systems leading to order of magnitude size, weight, and DC power savings.

It is to be understood that the invention is not limited to the exact construction illustrated and described, but that various changes and modification may be made without departing from the spirit and scope of the invention.

What is claimed is:

1. A multi-channel digital router/signal processor, comprising:
   a plurality of analog bandpass filters, each receiving a radio frequency analog input signal and providing a filtered output signal;
   a plurality of voltage control pulse generators, each coupled to a respective one to the analog bandpass filters and generating a plurality of voltage output pulse streams;
   a plurality of pulse splitters receiving the voltage output pulse streams from the voltage control pulse generators and providing a plurality of duplicate signal pulse outputs of each of the voltage output pulse streams;
   a plurality of pulse gates receiving said plurality of duplicated signal pulse outputs, said pulse gates providing a plurality of gated pulse train output signals;
   a plurality of pulse combiners receiving a single gated pulse train output signal from a pulse gate and combining said gated pulse train output signals into a single pulse train output;
   a plurality of multiply-accumulator circuits receiving said single pulse train output from said pulse combiners, said multiply-accumulator circuits multiplying and accumulating the pulse train output to provide a bandpass filter response output; and
   a digital processing unit receiving a plurality of pulse train outputs from the multiply-accumulator circuits and providing a digital word output.

2. The digital router/signal processor of claim 1, wherein said radio frequency analog input signal is divided into separate octave bands and wherein each octave band is assigned a separate channel of the processor for forthcoming signal processing.

3. The digital router/signal processor of claim 1, wherein each pulse gate receives a control signal input for controlling frequency translation.

4. The digital router/signal processor of claim 1, wherein each multiply-accumulator circuit receives a digital control signal for signal conditioning.

5. The digital router/signal processor of claim 4, wherein each multiply-accumulator circuit is programmed to accommodate any combination of the pulse train outputs from said plurality of pulse combiners.

6. The digital router/signal processor of claim 1, wherein said pulse combiners include an on and an off operational mode.

7. The digital router/signal processor of claim 2, wherein additional channels are provided by increasing the size limitations of said pulse splitters and said pulse combiners.

8. A digital signal processor for processing a radio frequency input signal, said processor comprising a plurality of channels, each channel including:
   a voltage control pulse generator for generating a voltage pulse train from the radio frequency input signal;
   a pulse splitter receiving the voltage pulse train and splitting the voltage pulse train into M duplicate voltage pulse trains;
   M number of pulse gates receiving the duplicate voltage pulse trains and generating M number of gated voltage pulse trains;
   a pulse combiner receiving and combining the gated voltage pulse trains into a single pulse train output; and
   a multiply-accumulator circuit receiving the single pulse train output, said multiply-accumulator circuit multiplying the pulse train output by a coefficient and accumulating the products for a predetermined period of time.

9. The digital signal processor of claim 8, wherein the number of channels is N, and wherein M>N.

10. The digital signal processor of claim 8, wherein a control signal is applied to the pulse gates to provide frequency translation of the gated voltage pulse trains.

11. The digital signal processor of claim 8, wherein an on-time and an off-time of the pulse gates programs the multiply-accumulator circuits to serially sample the radio frequency channels.

12. The digital signal processor of claim 11, wherein the on-time of the pulse gates for at least one channel is staggered.

13. The digital signal processor of claim 8, wherein larger pulse splitters and pulse combiners are used for adding additional channels.

14. A method of digital signal processing a radio frequency input signal, said method comprising:
   separating the radio frequency input signal into a plurality of channels;
   generating a voltage output pulse stream from the filtered input signals in each channel;
   splitting the pulse stream into a plurality of duplicate pulse streams in each channel;
   gating a plurality of the duplicate pulse streams in each channel to generate gated pulse streams;
   combining a gated pulse stream from each channel to provide gated pulse streams as a single pulse train output in each channel;
   multiplying and accumulating the combined gated pulse stream in each channel; and
   digitizing the combined gated pulse streams to produce a digital word output of the input signal.

15. The method of claim 14, wherein the step of gating the duplicate pulse streams includes providing frequency translation of the pulse streams.

16. The method of claim 14, wherein the step of splitting the pulse stream includes splitting the pulse stream into M number of duplicate pulse streams, and wherein there are N number of channels, and wherein M>N.

* * * * *